United States Patent [19]

Andrews et al.

[11] 4,360,805
[45] Nov. 23, 1982

[54] DIGITAL ERASE OF RASTER LINES

[75] Inventors: Edward W. Andrews, Milwaukee; Eugene C. Williams, Waukesha, both of Wis.

[73] Assignee: General Electric Company, Milwaukee, Wis.

[21] Appl. No.: 192,736

[22] Filed: Oct. 1, 1980

[51] Int. Cl.³ .............................................. G09G 1/16
[52] U.S. Cl. ............................ 340/744; 315/31 TV; 315/371; 340/726; 340/728; 358/242; 358/244
[58] Field of Search ............... 340/744, 726, 724, 728, 340/791, 811; 358/111, 244, 242; 315/371, 31 TV

[56] References Cited

U.S. PATENT DOCUMENTS

| | | |
|---|---|---|
| 2,548,219 | 4/1951 | Jenkins. |
| 2,681,383 | 6/1954 | Loe. |
| 2,908,754 | 10/1959 | Purington et al. |
| 3,422,223 | 1/1969 | Scipione. |
| 3,535,446 | 10/1970 | Hilburn. |
| 3,571,503 | 3/1971 | McMann. |
| 3,634,623 | 1/1972 | McMann. |
| 3,814,855 | 6/1974 | Kokado. |
| 3,855,496 | 12/1974 | Ciciora. |
| 4,096,530 | 6/1978 | Plugge et al. ................. 358/111 X |

OTHER PUBLICATIONS

Harold E. Ennes; *Digitals In Broadcasting;* Howard W. Sams & Co., Inc; 1977; pp. 245-247, 269-283.

*Primary Examiner*—David L. Trafton
*Attorney, Agent, or Firm*—Dana F. Bigelow; Douglas E. Stoner

[57] ABSTRACT

The perception of raster lines on a television monitor is obscured by continuously and cyclically vertically shifting and presenting in successive frames the raster in successive upward positions and then in successive downward positions by incremental amounts, the total maximum vertical shift distance being less than the distance between original horizontal raster lines, thus giving the appearance of blending the information between original horizontal raster lines. Vertical raster deflection is accomplished by cyclically delaying the original, or normal, vertically sync pulses by amounts which incrementally increase to a maximum for producing a vertical frame rise less than the distance between original horizontal raster lines and decrementally decrease to no delay. A photographic camera capable of multiple frame exposure time is used to produce photographs of the video monitor without connections or operational dependence upon the television monitor system. An all-digital system provides increased reliability and repeatability as well as manufacturing and maintenance economies.

12 Claims, 4 Drawing Figures

RASTER ERASE SYSTEM BLOCK DIAGRAM

FIG. 1 RASTER ERASE SYSTEM BLOCK DIAGRAM

DIGITAL ERASE OF RASTER LINES

BACKGROUND OF THE INVENTION

This invention relates to a method and apparatus utilizing digital logic for minimizing visual perception of the raster lines on a photographic film recording of a video or TV monitor picture. The principles of operation of a raster erase method utilizing analog rather than digital components, are disclosed in U.S. Pat. No. 4,096,530 issued to J. S. Plugge, William H. Wesbey, and James E. Blake and assigned to the assignee of the present invention. The disclosure of U.S. Pat. No. 4,096,530 is incorporated herein by reference.

As is well known, when a viewer is closely viewing a cathode ray tube video monitor, the horizontal raster lines can be seen on the face of the picture tube. However, if the viewer is far enough away from the face of the tube, the horizontal lines can no longer be resolved by the eyes, and the picture does not appear to be composed of a multiplicity of horizontal lines.

The present invention is concerned with "erasing" or obscuring the perception of the horizontal raster lines in a photograph taken of the screen of a video monitor tube when a static video picture is being displayed thereby. This results in a photograph that is of a more pleasing quality to human perception. An example of photographically recording static pictures on a video monitor tube arises in the medical field where video monitors are used to display "converted" X-ray images. In X-ray diagnostic systems, an X-ray images is converted to an optical image with an image intensifier, and the optical image is viewed with a video camera. The resulting video signals may be stored in a video recorder, and the signals from the recorder may be used to drive a video monitor. A photographic camera is directed towards the picture tube faceplate to enable photographic recording of any static image that is derived from the recorder and displayed on the monitor. When a conventional video system without a raster obscuration function is used, the raster scan lines are also recorded on the film with such high definition as to be very distracting to anyone studying the photograph for detailed information.

One method that has been proposed for reducing visualization of the raster lines is "dithering" or oscillating the scanning beam over the vertical distance of one pair of original scan lines as the scanning beam moves horizontally across the picture tube. This requires applying a high-frequency signal to the scanning coil of the video display tube such that the space ordinarily occurring between the scan lines appears filled and thusly perception of scan lines is reduced. However, this method has substantial technical problems associated with it as, for instance, the difficulty in controlling beam dithering with precision.

Additionally, it is well known in the TV art that a phenomenon known as "roll" occurs where the horizontal sync pulses are correct and the vertical scanning frequency (vertical sync pulse frequency) is off the normal 60 cps. rate. Under these conditions, the screen shows the bottom part of the televised subject at the top of the screen, the top part of the subject at the bottom of the screen, and the retrace bar as a visible black bar between the top and bottom parts of the screen. The picture continues to "roll" with increasing speed as the frequency of vertical sync pulses increases from the normal 60 cps. At the normal frequency, successive frames overlap. Thus, it can be seen that, if the vertical sync pulse is delayed in a next frame by a slight amount, such next frame appears to move up from the screen position of the original image. This is described in the art as "vertical roll" as described above wherein a large horizontal black bar appears across the screen and separates the bottom of the original image (appearing at the top of the "rolled" screen) from the top of the original image (appearing at the bottom of the "rolled" screen), as the image appears to roll vertically upward. The black bar demonstrates that a normally-transmitted vertical sync pulse is considered part of the image information data such as the black-grey-white image information.

Thus, as the amount of time from the sync pulse to the non-blanked informational horizontal sync pulses decreases, the image appears to shift upwards. In the present invention and in the invention of U.S. Pat. No. 4,096,530, the roll concept is utilized effectively to delay the vertical sync pulse by a predetermined small fraction of the time that normally occurs between the original vertical sync pulses. The original frame is rescanned a predetermined number of times. During each of these rescannings, the corresponding vertical sync pulse is delayed by an incremental amount that is larger than the delay that produced the previous vertical sync pulse. Thus, each frame will be slightly upwardly vertically offset from the previous one, the sum of such offsets being less than the distance between the original horizontal raster lines. When photographed, the raster lines associated with the original frame will appear to be obscured. Rescanning is repetitively performed over a predetermined number of incrementally and vertically-spaced positions, but short of coinciding with the next normal information line.

Therefore, picture information from adjacent lines of the orignal image is blended into the space between the adjacent horizontal lines of the original image during a photographic exposure interval.

For example, in the invention of U.S. Pat. No. 4,096,430, 16 frames occur, with the first being normal, and the following 15 frames each being offset from the previous frame by a vertical space equal to 1/16 of the distance between original or normally-spaced horizontal scan lines. With these rescannings, visual perception of obscuration of the raster lines results. In an interlaced system, the delay used for the rescanning of a frame is actually the use of the same delay time for each of both the odd and even fields for each of the rescannings.

Additionally, in the system of U.S. Pat. No. 4,096,530, a photographic camera is incorporated, and an exposure button is closed each time a photograph of a video image is to be taken. The shutter of the camera is electromechanically connected to and opened by the raster erase system. Thereafter, sixteen scannings of the static picture is displayed, and the camera shutter is subsequently electrically closed, following which a film transport is energized to move the film to the next photographic-negative position. In that system, both analog and digital control circuitry are used. In such type of system, however, it would be desirable to obviate the need for an integrated camera and thereby reduce the complexity and cost of the system. In addition, it would be desirable to increase electronic reliability and decrease component cost by utilizing all-digital electronic circuitry.

OBJECTS OF THE PRESENT INVENTION

A primary object of the present invention is to provide a new and improved method and apparatus for producing a video display in which the raster scan lines are obscured to the extent of being not apparent in a photograph taken of the display.

Another object of the present invention is to improve the quality of photographs taken of images appearing on video picture tubes.

Another object of the present invention is to provide a new and improved vertical sync signal generating method and apparatus involving all-digital circuitry for thereby better assuring repeatability, reliability of operation, and reducing manufacturing and maintenance costs.

Another object of the present invention is to employ in a video monitor image display system a new and improved vertical sync signal generating method and apparatus.

Still another object of the present invention is to provide a raster erase function which is automatically and continuously effective such that any photographic camera using a multiple frame exposure time can be used in producing raster-erased photographs of a video monitor, with no connections to nor operational dependence upon the photographic system.

SUMMARY OF THE PRESENT INVENTION

The foregoing objects of the present invention are accomplished by incorporating raster erase means completely within a static image video display controller such that interaction with a camera shutter mechanism is unnecessary. Two stages of operation are used. In one stage, a sequence of successive rasters is presented, each of which is shifted vertically in a first vertical direction by incremental amounts totalling less than the distance between one pair of horizontal lines corresponding to the raster image first presented without shift (base raster). In the opposite stage, a second sequence of successive frames, or rasters, occurs wherein each is shifted vertically in a second and opposite vertical direction. At the end of each of these two-stage sequences, the static image is at its original position. This cycle is repeated continuously so that any photographic camera capable of a multiple frame exposure time is usable. By use of this continuous cyclic bidirectional presentation the need for a synchronized camera is obviated, and it does not matter when the shutter is open for multiple frames, preferably at least 16 presentations of frames. All components of the Raster Erase System of the display controller are digital.

DESCRIPTION OF THE PREFERRED EMBODIMENT

General Description

Figure 1:
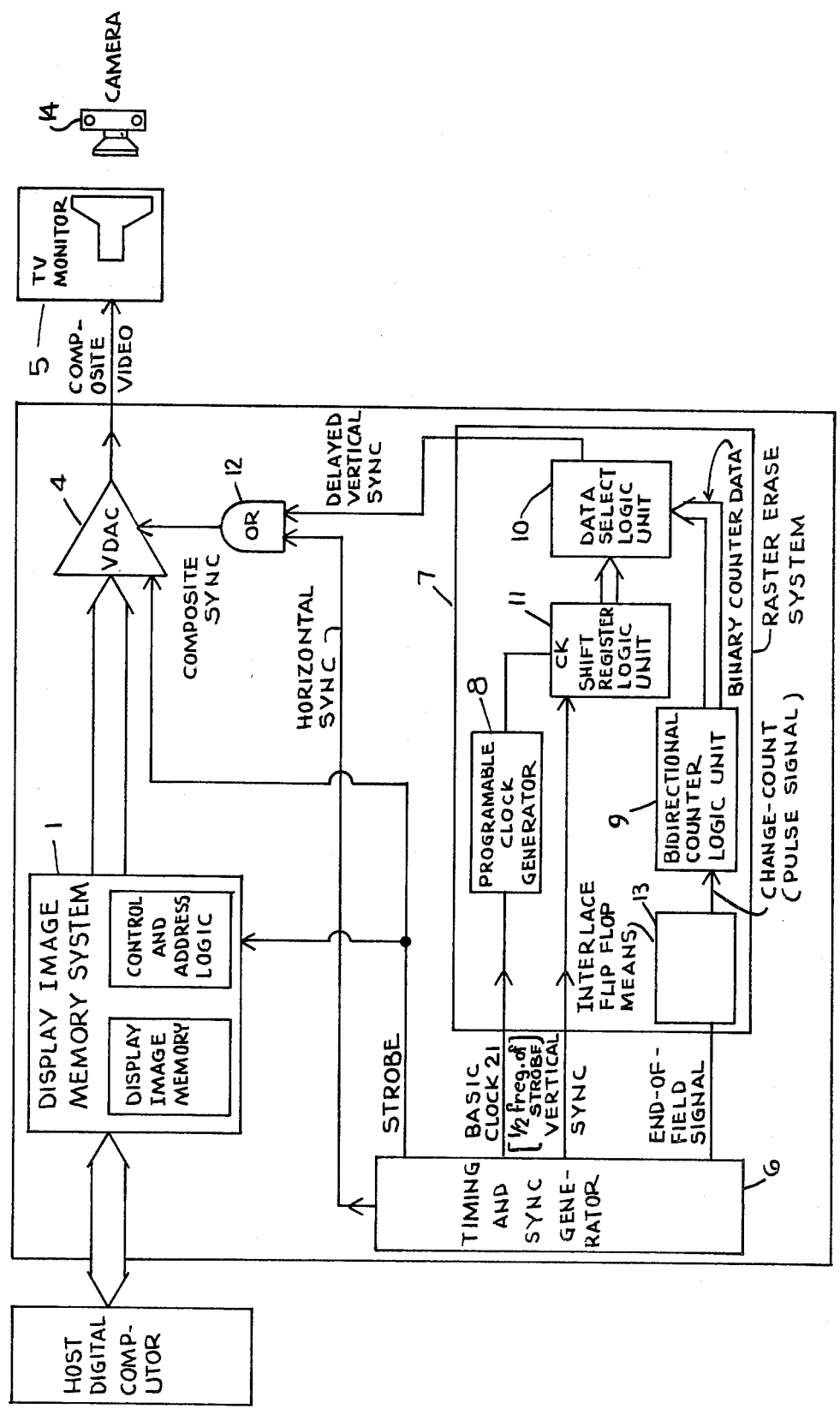
FIG. 1 is a block diagram of a system for obscuring or "erasing" video raster lines in a static image video monitor display controller including raster-scan-shifting means in accordance with the present invention.

The apparatus of FIG. 1 is particularly useful, for example, with X-ray or tomographic medical diagnostic systems which produce two-dimensional digital camera matrices of grey scale values that are indicative of energy absorption of an examined body and are then stored in the memory of a generally illustrated Host Digital Computer. Such a digital matrix is then transferred to the Display Image Memory System 1 and in particular to its Display Image Memory Subsystem 2. A Control and Address Logic Subsystem 3 transfers image data from the Host Digital Computer to the Display Image Memory Subsystem 2 and later transfers this image data to the Video Digital-to-Analog Converter (VDAC) 4. The VDAC 4 takes the digitized camera matrix, converts it to an analog picture information signal which is then combined with the composite sync having the modified (delayed) vertical sync and the horizontal sync to produce a composite video signal which is fed to a TV Monitor 5. The monitor uses the vertical sync signal from the composite video signal to initiate vertical deflection, the horizontal sync signals to initiate horizontal deflection, and the picture information signals (representative of grey scale) to produce successive rasters comprised of vertically-spaced horizontal lines that are intensity modulated by the picture information signals. A Timing and Sync Generator 6 produces a strobe signal, a basic clock signal whose transitions are synchronous with the strobe but at one-half the frequency of the strobe, a vertical sync pulse signal or train which may also be considered the "original" vertical sync pulse signal, a horizontal sync pulse signal or train which may also be considered the "original" horizontal sync pulse signal and an End-of-Field pulse signal. It is unnecessary to deal with sripping the original vertical sync signal out of the composite video (as in U.S. Pat. No. 4,096,530) by making use of the original vertical sync signal and basic clock pulses that come directly from the Timing and Sync Generator 6.

The basic clock pulses, vertical sync pulses, and End-of-Field pulse signals feed into the Raster Erase System generally designated 7. The Raster Erase System 7 is composed of a Programmable Clock Generator 8, a Bidirectional Counter Logic Unit 9, a Data Select Logic Unit 10, and a Shift Register Logic Unit 11. The Raster Erase System 7 outputs the sequence of delayed vertical sync pulses which, along with the original horizontal sync pulses, are fed to an OR-gate 12 whose output is thus the composite sync signal. The input to the Programmable Clock Generator 8 is the basic clock of the Timing and Sync Generator 6. The output of the Programmable Clock Generator embodied here is a clock pulse wherein the "0" logic level lasts a variable number of basic clock pulses (for example, from 1 to 16 basic clock pulses) and the "1" logic level lasts a fixed number of basic clock pulses (for example, 16 basic clock pulses). It should be noted that any Programmable Clock Generator 8 whose logic outputs last exact multiple periods of the basic clock output of the Timing and Sync Generator may be used. The original vertical sync signal produced by the Timing and Sync Generator 6 is then inputted into the leftmost position of a "shift-right" Shift Register Logic Unit 11 whereby the bits of the signal are shifted one position to the right upon each output clock pulse of the Programmable Clock Generator 8. A data Select Logic Unit 10 enables the output of one particular bit of the Shift Register Logic Unit 11 and transmits its output as the output of the Raster Erase System 7. The Data Select Logic Unit 10 is controlled by the Bidirectional Counter Logic Unit (BCLU) 9. For example, assume that the BCLU 9 is initialized to a count, or binary memory logic state, of 0 and is set to upcount. Thus, as the bidirectional counter of the BCLU 9 upcounts, the output of the Raster Erase System 7 is the delayed vertical sync signal which becomes successively delayed in increments of the period of one clock period of the Programmable Clock Generator output. This assumes that the Bidirectional Counter Logic Unit is initialized to a count of 0 and is set to upcount. By the use of a 4-bit DIP switch (not shown) connected to the bidirectional counter of this unit, the unit can be programmed to start at any count and direction. For example, it could be pre-programmed to start with a count of 15 and to downcount, in which case the first raster presented would be the most upwardly shifted one, the next a little less vertically shifted than the first (i.e., down one increment), until the base raster (that raster produced in response to an original vertical sync pulse and original horizontal sync pulses) is presented. This would be followed by the rasters being presented increasingly upwardly vertically shifted until the binary memory of the bidirectional counter again reached a count of 15 corresponding to the most upwardly shifted position and the cycle would then repeat.

Thus, with such an arrangement, the raster image corresponding to the undelayed vertical sync and undelayed horizontal sync signal would not necessarily appear as the first raster presented but could be presented as an intermediate raster in the sequence of the cycle.

When the Raster Erase System 7 is producing delayed vertical sync pulses for a non-interlaced display, the End-of-Field (EOF) pulse is fed directly to the bidirectional counter of the BCLU. If the Raster Erase System 7 is producing delayed vertical sync pulses for an interlaced display, the EOF pulse is fed to an interlace flip-flop means 13 which divides the frequency of the EOF pulses by two. The signal that feeds into the bidirectional counter may be called the Change-Count pulse in either the interlace or non-interlace case. Inasmuch as there are two fields ("odd" and "even") per frame, having the output of flip-flop 13 fed into the clock input of the Bidirectional Counter Logic Unit 9, results in the same delay being generated for both fields, due to the fact that the count in the bidirectional counter remains the same during both fields. In either case, as a result of the Change-Count pulse, the Bidirectional Counter Logic Unit 9, if initialized as stated above, will count up from 0000 to 1111 and then back down to 0000 and cyclically repeat. This results in the delayed vertical sync signal having a delay which successively increases from 0 to 15 periods of the Programmable Clock Generator 8 output (output clock pulses) and then decreases back down to 0 periods of the Programmable Clock Generator 8 output and then cyclically repeats. The resultant delayed vertical sync as well as the original horizontal sync are OR-ed together at 12 to become the composite sync. This composite sync signal, as well as digital data bits of grey scale video information from the Display Image Memory Subsystem 2 of the Display Image Memory System 1 as selected by the Control and Address Logic Subsystem 3 of the Display Image Memory System 1, are fed into the ultra-fast video D/A converter (VDAC) 4, which outputs a suitable composite video signal having the desired delayed vertical sync signals as well as the horizontal sync and picture information signals.

One composite video standard EIA RS170 requires that vertical and horizontal sync pulses be of negative voltage but that the white-grey-black camera signal, or intensity, may be of positive voltage. This standard is usually used in closed circuit TV systems. Each method is meant to match the driving requirements of the particular cathode ray tube system—and in general whether the system is driving the cathode or the grid. The present invention deals primarily with the production of the delayed vertical sync signal. The VDAC 4 embodied in the presently-disclosed embodiment should meet this or any suitable video standard for composite video signals.

The Control and Address Logic Subsystem 3 in the Display Image Memory System 1 feeds the digital grey scale data to the VDAC 4 in synchronization with the strobe signal produced by the Timing and Sync Generator 6. As a result, one raster (image) will be displayed on the television monitor for each delayed vertical sync signal received.

Any photographic camera 14 capable of having its shutter held open for a period of time equal to a multiple of periods of the Programmable Clock Generator output, preferably 16 output clock periods of the Programmable Clock Generator 8, is suitable for use. No connection of any sort is needed between the camera 14 and any part of the TV Raster Erase System 7. However, movement of the film to its next photographic frame position is performed by automatic operation of the camera or manually and not by any action of the Raster Erase System 7.

Figure 2:
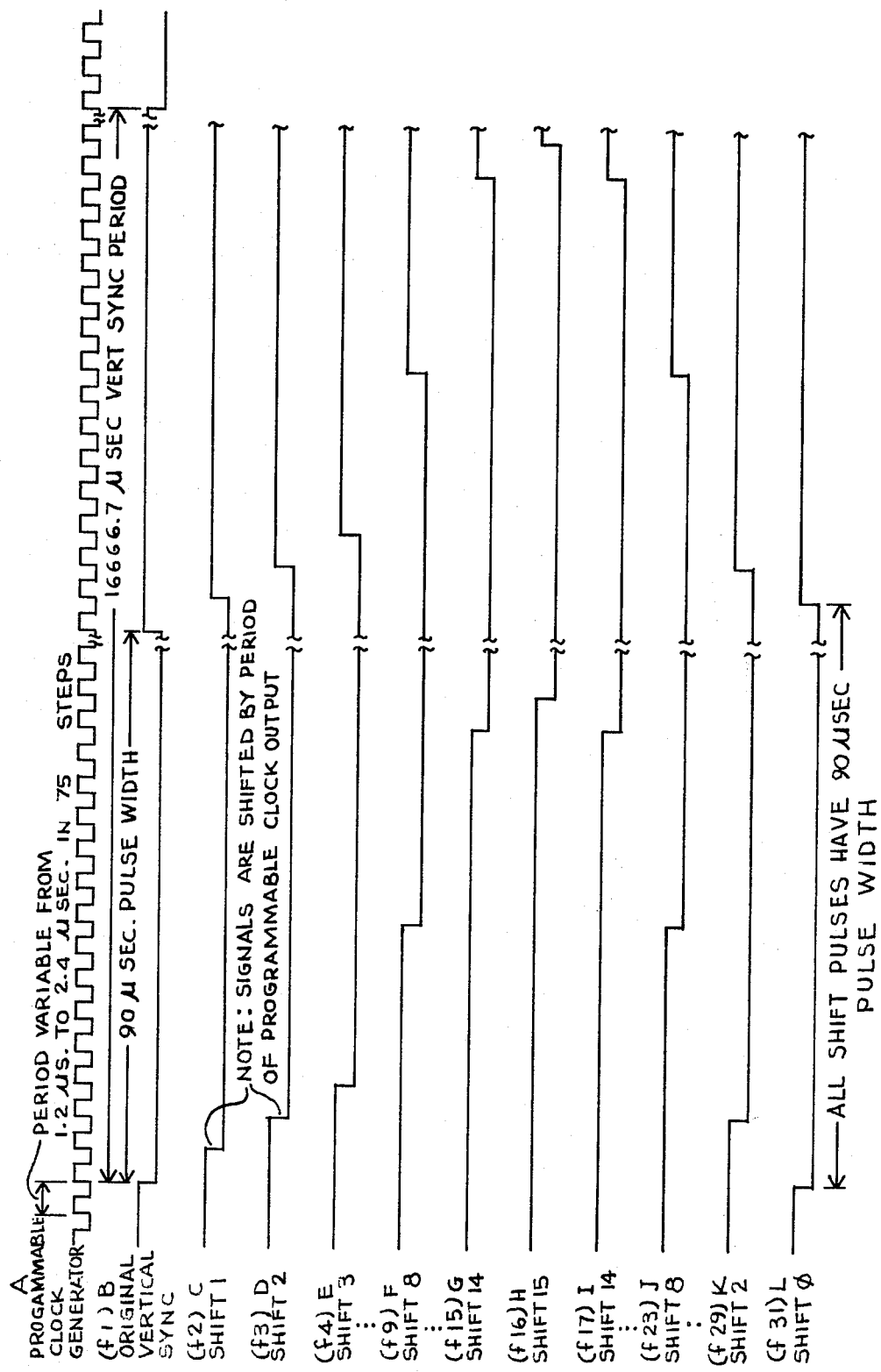
FIG. 2 is a set of waveforms illustrating some of the forms and relationships of the sync pulse waveforms which are generated when the system is operating and performing a raster shift, or line erase, function.

In FIG. 2, the time relationships of signals used at various times in the operation of the presently-disclosed embodiment of the present invention are shown. The top-most waveform A is the output of the Programmable Clock Generator 8 (wherein the "1" time is selectively set equal to the "0" time by an appropriate setting of the DIP switch in the Programmable Clock Generator 8). The next waveform B is that of a typical vertical sync pulse originating from the Timing and Sync Generator 6 and is hereinafter referred to as the "original" vertical sync pulse. Where the binary memory, or count, of the BCLU 9 is set to 0, the vertical sync signal originating from the Timing and Sync Generator 6 is hereinafter referred to as the "base" vertical sync signal. In any case, the original vertical sync is 90 microseconds in width with a period of 16,666.667 microseconds. The next waveform C, described as "SHIFT 1," has been delayed by one period of the Programmable Clock Generator 8 output. This waveform is a result of the Bidirectional Counter 9 having upcounted to 0001 whereby the gating circuit of the Data Select Logic Unit 10 shown in FIG. 1 is caused to select the first bit of the Shift Register Logic Unit 11 to be gated out as the output of the Raster Erase System 7 (to be the delayed vertical sync signal SHIFT 1). Similarly, the SHIFT 2 signal, waveform D, results when the Bidirectional Counter Logic Unit 9 upcounts to 2 (0010) and the Data Select Logic Unit 10 is caused to select the second bit of the contents of the Shift Register Logic Unit 11. The output of the Raster Erase System 7 is here delayed by two periods of the Programmable Clock Generator 8 output. Waveforms E, F, and G represent the original vertical sync signal when delayed by 3, 8, and 14 periods, respectively, of the output of the Programmable Clock Generator 8. The SHIFT 15 signal, waveform H, results when the Bidirectional Counter Logic Unit 9 upcounts to 15 (1111) and the Data Select Logic Unit 10 is caused to select the fifteenth bit of the Shift Register Logic Unit 11 to be exclusively gated as the output of the Raster Erase System 7. Then the Bidirectional Counter Logic Unit 9 downcounts to 14 (1110), and the Data Select Logic Unit 10 selects the fourteenth bit of the Shift Register Logic Unit 11 as the output of the Raster Erase System 7. Finally, the Bidirectional Counter Logic Unit 9 downcounts back to zero (0000) and the Data Select Logic Unit 10 selects the "original" (undelayed) vertical sync signal as the output of the Raster Erase System 7 as shown in waveform L. The Bidirectional Counter Logic Unit 9 now upcounts and repeats the above cycle.

Thus, in general, the system produces a cyclical sequence wherein (i) a base raster is produced corresponding and in response to the original vertical synce pulse, and (ii) a predetermined number of vertically-shifted rasters are produced in two stages. In one stage of the sequence, a predetermined number of the shifted rasters are shifted vertically upward, each shifted relative to the immediately preceding raster by a predetermined amount, with the horizontal lines of the highest-shifted raster being below the next upwardly-adjacent horizontal lines of the base raster, produced by increasing the delay associated with each raster by a predetermined amount relative to the delay associated with the immediately preceding raster and in an opposite stage of the sequence, a predetermined number of shifted rasters are shifted vertically downward, each by a predetermined amount relative to the position of the immediately preceding shifted raster, with the horizontal lines of the lowest-shifted raster being above the corresponding horizontal lines of the base raster produced by decreasing the delay associated with each raster by a predetermined amount relative to the delay associated with the mmediately preceding raster.

Inasmuch as the delayed vertical sync pulses have the same waveform as the "original" vertical sync pulse but are merely delayed, all the periods of the vertical sync output pulses of the Raster Erase System 7 will be the same (90 microseconds in the presently-disclosed embodiment). One delayed vertical sync pulse will output from the Raster Erase System 7 for each "original" vertical sync pulse, and each will be offset from the immediately preceding one-by-one period of the Programmable Clock Generator 8 output (that is, the period of one output clock pulse of the Programmable Clock Generator 8) since the Bidirectional Counter Logic Unit 9 increments or decrements once after each Change-Count pulse (which occurs at the end of each frame), produced in response to EOF pulses, is received by the Raster Erase System 7.

DETAILED DESCRIPTION OF A PREFERRED EMBODIMENT

Figure 3A:
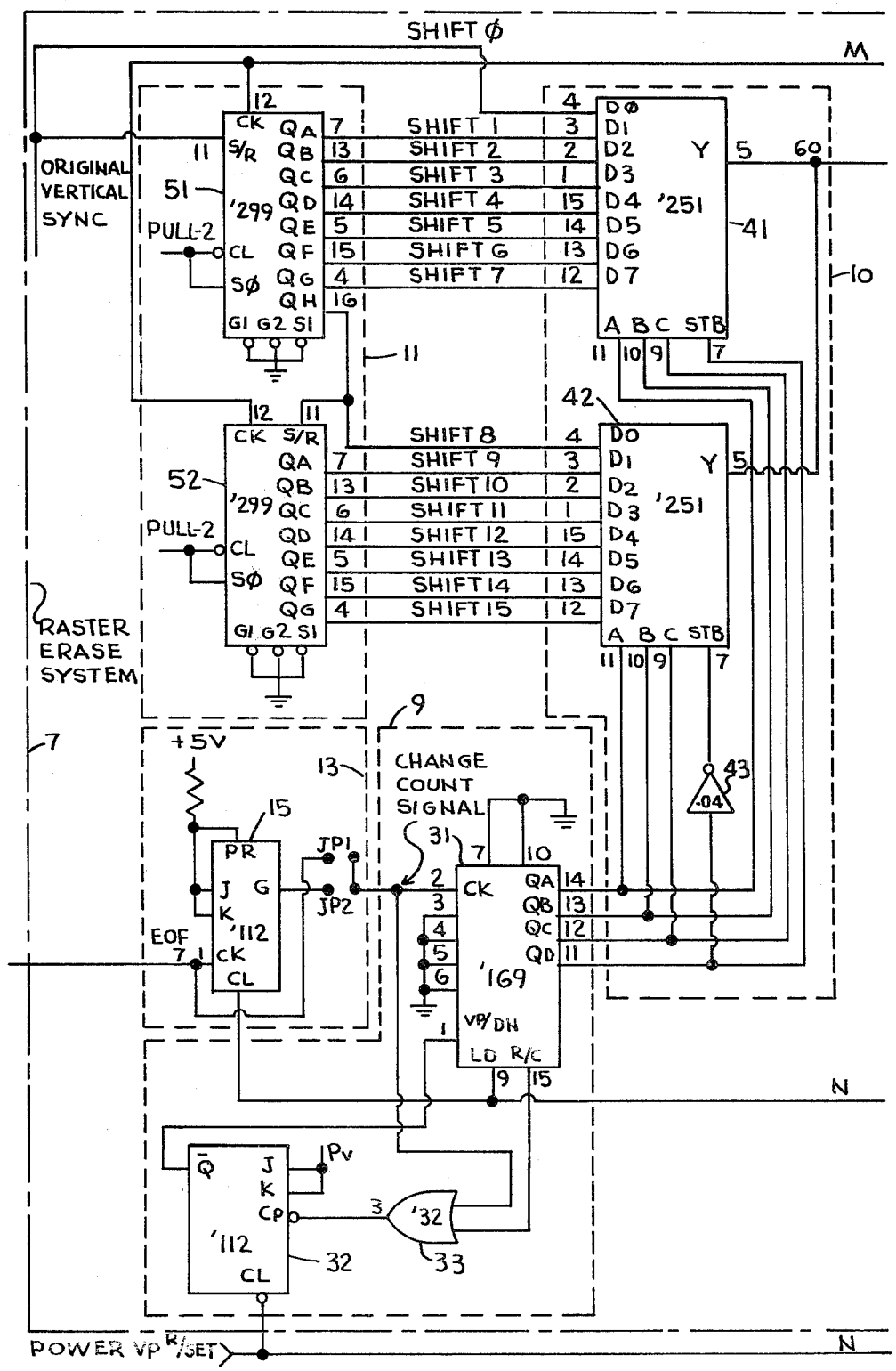
FIGS. 3A and 3B show a detailed diagram of the circuitry of the embodiment shown in FIG. 1 effective for processing video signals to effectuate line erasure, or line obscuration, in accordance with the raster shift feature of the present invention.
Figure 3B:
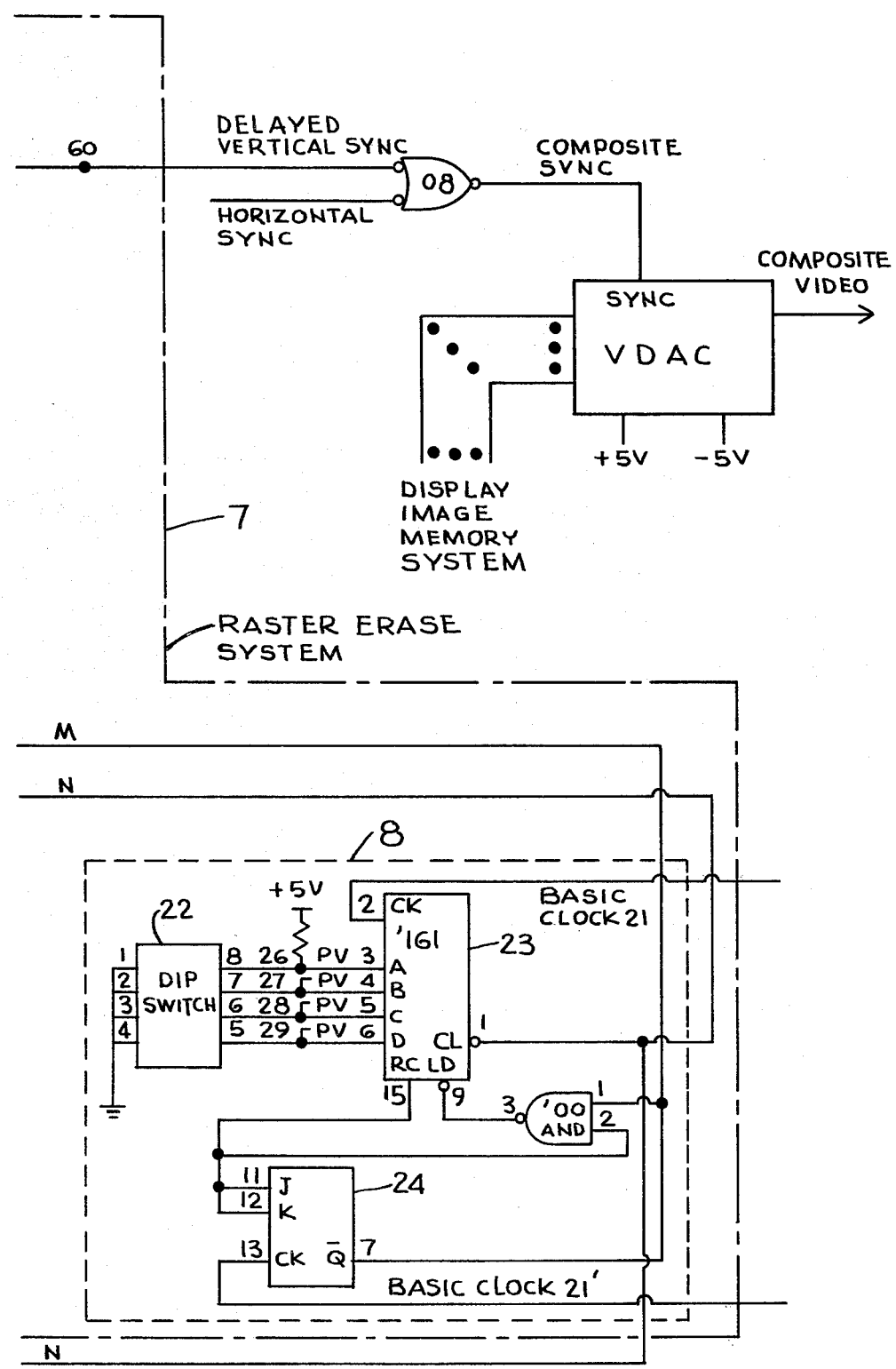

FIGS. 3A and 3B illustrate a preferred physical embodiment of the invention as generally described above with respect to FIGS. 1 and 2, and the system is hereinafter described with reference to the details of its several subsystems included n the Raster Erase System 7, namely, the Programmable Clock Generator 8, the Bidirectional Counter Logic Unit 9, the Data Select Logic Unit 10, and the Shift Register Logic Unit 11. In FIGS. 3A and 3B, a suitable jumper connector connected across contact points designated JP1 within Interlace Flip-Flop Means 13 causes the system to operate in a non-interlace mode, while a jumper connector connected across contact points JP2 causes the system to operate in two-part interlace mode. After the two consecutive fields constituting the frame have been delayed or shifted, a flip-flop 15 within the Interlace Flip-Flop means 13 resets. Thus, the flip-flop 15 serves as a divide-by-two counter allowing every other EOF pulse to get through (that is, the Change-Count pulse), resulting in the same delay or shift occurring for both odd and even fields of a frame.

It is well known in the art that various specifications of integrated circuits can be developed based on a given logic specification or timing diagram. For example, in FIG. 3, the logic specification of a "J-K" flip-flop is satisfied by an integrated circuit type such as a well-known "112" which is shown, although any integrated circuit type in its commercial family, such as 74LS112, 54LS112, 74112, 54S112, 54H112, 74H112 available from Signetics Corporation and functionally similar integrated circuit types and any other equivalents can be suitably used. The preferred embodiment shown (both the block diagram general description and the detailed description) is meant to be an illustrative example and not a limitation on the breadth and scope of the invention which is as defined and set forth in the claims.

Programmable Clock Generator

A Programmable Clock Generator 8 is used to vary the speed of operation of the shift register which therefore means that the Programmable Clock Generator 8 controls the speed of operation of the entire Raster Erase System 7. The Programmable Clock Generator 8 of the preferred embodiment is made up of: a basic clock line 21 (which is an output from the Timing and Sync Generator 6 and provides basic clock pulses), a four-position DIP-type switch 22, a four-bit counter 23, a J-K flip-flop 24, and an AND-gate 25 as shown in FIGS. 3A and 3B. The four-bit counter 23 can be a 74LS161 commercially available from Texas Instruments and Signetics Corporation. The J-K flip-flop 24 is a 74LS112, the AND-gate 25 is a 74LS08, both commercially available from Signetics Corporation, and the DIP switch 22 is a 435166-2 commercially available from Amp Corporation. The Programmable Clock Generator 8 basically provides an output "1" for 16 basic clock pulses and is "0" for a varying number of basic clock pulses depending upon the setting of the DIP switch 22. Each DIP switch individual switch, when closed, connects the corresponding output position to ground. When not closed, the output of each such individual switch is free to be at the voltage of a source connected to that output, usually through one of a plurality of pull-up resistors 26, 27, 28, and 29, as shown in FIG. 3. The pull-up resistors 26, 27, 28, and 29 are each 1K ohms and the voltage source is 5 volts. The four-bit counter 23 has a count, a clock input CK, a clear input CL, a load input LD (which causes the counter to be loaded with whatever count is being stored at the DIP switches when LD is a "0," i.e., pin 3 of the LS00 is a "0"), and a ripple-carry output RC which goes to "1" when the counter goes through a 1110 to 1111 transition and returns to "0" when the counter goes through a 1111 to 0000 transition. The basic clock from the Timing and Sync Generator 6 provides the clock input to the counter. The J-K flip-flop 24, which changes output when both J and K inputs go from "1" to "0," is clocked by the same basic clock 21 as the four-bit counter 23.

The following example illustrates operation of the Programmable Clock Generator 8. Assuming the individual switches of the DIP switch 22 were set to 8 ("1000" [the "1" on pin 6 of the counter is not grounded]), the "0" time of one period of the Programmable Clock Generator 8 is equal to (16-8)=8 basic clock pulses (since the counter 23 will count from the number introduced at the DIP switches up to 15). A pulse to the Clear input of the four-bit counter 23 is produced by a suitable Power-Up Reset Signal of the overall system. Upon initialization by the Clear Input CL, the counter 23 will be set to zero (the LD input is not enabled) and the $\overline{Q}$ output of the J-K flip-flop will be at "1," the counter 23 will then count up to 15. This will produce a ripple carry upon the "1" to "0" transition, and the J-K flip-flop 24 will change state to a "1." Since J,K=1, pins 2 and 1 of the NAND-gate 25 are both "1," pin 3 of the NAND-gate 25 will be a "0," and therefore a load will be performed at LD upon the next clock pulse. Then $\overline{Q}$ of the J-K flip-flop 24 becomes a "0" and a "1000" is loaded from the DIP switches 22 into the counter 23. Now the counter 23 is clocked back up to where it will produce another ripple carry (7 basic clock pulses later) which, upon the "1" to "0" transition, causes the J-K flip-flop 24 to change state. Since the pin 2 input to the NAND-gate 25 is a "1," the pin 1 input to the NAND-gate 25 is a "0," therefore, there is a "1" on pin 3 of the NAND-gate 25, and a load will not be performed at this time. Upon the next basic clock pulse, output $\overline{Q}$ of flip-flop 24 will become a "1" and the counter 23 will be all zeros. The count then continues for 15 basic clock pulses until a ripple carry is again generated. The sixteenth basic clock pulse causes $\overline{Q}$ to change again to a zero and a load will occur at LD upon the next basic clock pulse since $\overline{Q}$ equals 1 and J,K equals 1, and, therefore, a "0" will appear at pin 3 of the NAND-gate 25. Therefore, $\overline{Q}$ is at a high "1" state for 16 pulses and a low "0" state for 8 pulses, i.e., loading every other time. The total time for one period of output of the clock cycle is thus (8+16)×75 nanoseconds=1.8 microseconds. The Programmable Clock Generator 8 embodied here can thus vary the low state ("0") time from 1 to 16 basic clock pulses while the high state ("1") portion of the Programmable Clock period is always 16 basic clock pulses in the embodiment shown here.

It should again be pointed out that any Programmable Clock Generator method is valid as long as the outputs are exact multiple periods of the basic clock produced by the Timing and Sync Generator 6.

Bidirectional Counter Logic Unit

A Bidirectional Counter Logic Unit 9, as shown in FIGS. 1 and 3A and 3B, controls the setting of the Data Select Unit 11. This Bidirectional Counter Logic Unit 9 receives Change-Count pulses as clock pulses and is initialized in the embodiment shown here so as to cyclically first count up and then count down. It should be recognized that the initial count (binary memory logic state) and direction of counting is a matter of initial setting. In a preferred embodiment, it first counts up from zero ("000") to 15 ("1111") and then in the second portion of the cycle counts back down to zero ("0000"). The count of the counter serves as the control input of the Data Select Logic Unit 10. The Bidirectional Counter Logic Unit 9 subsystem consists of a four-bit bidirectional up/down counter 31, an up/down direction flip-flop 32, and an OR-gate 33. An additional flip-flop 15 is used for maintaining the delay selected for both odd and even fields of an interlaced frame. The four-bit bidirectional up/down counter 31 used in the preferred embodiment is a 74LS169, the direction flip-flop 32 is a 74LS112 J-K flip-flop, and the OR-gate 33 is a 74LS32, all available commercially from Signetics Corporation or Texas Instruments Corporation. The bidirectional up/down counter 31 has a load input connected to the line carrying the Power Up Reset Signal of the overall system, a clock input connected to the line carrying the Change-Count signal line, an up/down input bit, a ripple-carry output, and a four-bit output which provides the count. The ripple-carry signal is a "1" except when the count is either "1111" or "0000" during which the ripple-carry signal is a "0." This is opposite to the usual operation of a ripple carry. The End-of-Field pulse (which is coincidental with the Change-Count pulse in a non-interlace mode) has a width of 30 microseconds and is produced 810 microseconds after the original vertical sync pulse, both of which are produced by the Timing and Sync Generator 6. The direction flip-flop 32 has a clock input, a J input, a K input, a Clear input, and an Output $\overline{Q}$. The $\overline{Q}$ output of the up/down flip-flop 32 is connected to the up/down input of the bidirectional up/down counter 31. The J input and K input are connected to a pull-up voltage source so that they are always at the high logic level. Therefore, the J-K flip-flop 32 will change state upon every "1" to "0" transition fed into its clock input. The clock input is connected to the output of the OR-gate 33. The OR-gate 33 has two inputs: (1) the Change-Count Signal and (2) the ripple-carry output of the bidirectional up/down counter 31. Operationally, the clear signal sets the count of the bidirectional up/down counter 31 to 0 and also resets flip-flop 32 to "0." Therefore, the up/down input bit of counter 31 will be a "1." Upon receipt of each Change-Count pulse to the clock input of the bidirectional up/down counter 31, counter 31 will count up since the up/down input bit of counter 31 is a "1." Upon receipt of the first Change-Count pulse, the count of counter 31 will go to a 1, the ripple carry will be a "1," the end of the first Change-Count pulse which also feeds into the OR-gate 33 will hae no effect since the ripple carry is a "1," and, therefore, the J-K flip-flop 32 ('112 type), which only triggers on a "1" to "0" transition, will not be changed (since the "1" of the ripple carry prevents the end of the Change-Count pulse from changing the output of the OR-gate 33 from its "1" value). Thus, the $\overline{Q}$ output of direction flip-flop 32 remains a "1", and the bidirectional up/down counter 31 keeps counting up to 14. On the fifteenth Change-Count pulse, the count of bidirectional up/down counter 31 becomes a "1111" and the ripple carry becomes a "0." At the end of that Change-Count pulse, both of the inputs to OR-gate 33 become "0" and, therefore, there results a "1" to "0" transition that is fed into the clock input of the J-K flip-flop 32, thus causing it to change state (i.e., $\overline{Q}$ of flip-flop 32 will become a zero). Upon receipt of the next Change-Count pulse, the up/down input bit of bidirectional up/down counter 31 is a zero and therefore the count of counter 31 will decrement to 14 ("1110") and the ripple carry returns to being a "1."

Data Select Logic Unit

A Data Select Logic Unit 10 selects the appropriate position of the Shift Register Logic Unit 11 and connects that position to an output node 60 of the Raster Shift Erase System 7. The signal on the output node 60 is the delayed vertical sync signal that is used in the composite video signal fed to the television monitor 5 shown in FIG. 1. In the Raster Shift Erase System 7, there is no composite signal produced or to be stripped to produce the original vertical sync pulse. Rather, this system takes the original vertical sync signal directly from the Timing and Sync Generator 6. The only composite sync signal in this system is that produced by combining the original horizontal sync signal from the Timing and Sync Generator 6 with the delayed vertical sync signal that is the output of the Raster Erase System 7. This composite sync signal is then fed to the VDAC 4. The actual output position, or bit, of the Shift Register Logic Unit 11 that is selected is determined by the binary state, or count, contained in the binary memory of the Bidirectional Counter Logic Unit 9. In other words, if the count contained in the binary memory of the Bidirectional Counter Logic Unit 9 is a 10, the "SHIFT 10" output line of the Shift Register Logic Unit 11 will be enabled as an input, or data input bit, to the Data Select Logic Unit 10, all other data input bits will be disabled with the result that the signal contained in the SHIFT 10 position of the Shift Register Logic Unit 11 will be transmitted as the data select output to the output means or node of the Raster Shift Erase System 7 as the vertical sync signal of the composite video signal.

In the preferred embodiment, the Data Select Logic Unit 10 comprises two integrated circuit chips of the '251 data selector unit family (here 74LS251 is available from Signetics Corporation)—one stage for the lower bits 41 and one stage for the upper bits 42—and an inverter 43 of the '04 family (here 74LS04 also available from Signetics Corporation). The input to the lowest stage of the Shift Register Logic Unit 11 is the original vertical sync signal line. Each '251 data selector unit stage of the Data Select Logic Unit 10 has eight data input bit inputs numbered $D_0$ through $D_7$ that correspond such that: $D_0$ of element 41 is connected to the original vertical sync signal, $D_1$ of element 41 is connected to the SHIFT 1 output of the Shift Register Logic Unit 11 (pin 7 of the lower bits stage shift register '299 [the upper one-element 51] of the Shift Register Logic Unit 11 is connected to pin 3 of the lower-bits-handling '251 first stage data selector unit [element 41]), ..., $D_7$ of the lower-bits-handling '251 first stage data selector unit (element 41) is connected to the SHIFT 7 output of the Shift Register Logic Unit 11, the eighth output of Shift Register Logic Unit 10 (SHIFT 8) is connected to both the shift register unit input of the second stage of the Shift Register Logic Unit 11 (the stage that handles the upper bits [element 52] as well as the $D_0$ input of the second stage '251 data selector unit (element 42). The SHIFT 9 output of the Shift Register Logic Unit 11 (pin 7 of the second stage '299-element 52) is connected to the $D_1$ input of the second stage '251 data selector unit (element 42), ..., the SHIFT 15 output of the Shift Register Logic Unit 11 (pin 4 of the second stage '299-element 52) is connected to the $D_7$ input of the second stage '251 data selector unit (element 42).

To select the appropriate input line, each '251 data selector unit stage has four data select inputs labelled A, B, C (select bits), and STB (strobe input), (pins 11, 10, 9, and 7, respectively). Input A (pin 11), the lowest select bit of both of the '251 units, is connected to the lowest bit of the binary memory of the Bidirectional Counter Logic Unit 9 (pin 14, $Q_A$), ..., input C (pin 9) of both of the '251 data selector units is connected to pin 12 ($Q_C$) of the binary memory of the Bidirectional Counter Logic Unit 9. Input STB (pin 7) of the lowest stage '251 data selector unit (element 41) is connected to pin 11, the highest bit of the binary memory of the Bidirectional Counter Logic Unit 9 with an inverter 43 in the path leading from this pin 11 of the Bidirectional Counter Logic Unit 9 to the strobe input STB (pin 7) of the second stage '251 data selector unit (element 42). The inputs A, B, and C of the '251 units are known as the select bits, or ABC Select. The strobe input STB line of the '251, when energized to a "1" will inhibit the operation of that '251. Therefore, a "0" on the STB line of the '251 enables the '251 to decode and perform the appropriate switching. The stage outputs, or Y outputs, of both '251 stages are connected together allowing the output of either or both stages, in theory, to be transmitted to the data select output 60 as the Delayed Vertical Sync Signal, which is the vertical sync signal that is fed into the final composite video signal.

The operation of the Data Select Logic Unit 10 can be better understood from the following example. If the binary memory, or count, of the Bidirectional Counter Logic Unit 9 is zero ("0000"), the desired output is to select $D_0$ of the first stage '251 data selector unit (element 41), which is connected directly to the original vertical sync signal line. The selection of the proper stage is assured by use of the inverter to the STB strobe input of the second stage '251 data selector unit (element 42). Since a "0" will appear on $Q_D$ of the Bidirectional Counter Logic Unit 9, a "1" will appear on the STB strobe input of the second stage '251 data selector unit (element 42) causing to to disable. A "0" will appear on the STB strobe input of the first stage '251 data selector unit (element 42) causing it to be enabled and perform the proper switching. Thus, only the $D_0$ of the first stage '251 (element 41) will be transmitted as the delayed vertical sync signal. If the $Q_A$, $Q_B$, $Q_C$, $Q_D$ of the Bidirectional Counter Logic Unit 9 is a "0001," then the $D_1$ input (SHIFT 1) of the first stage '251 (element 41) will be transmitted to its Y, or stage output, and then outputted to the data select output 60 as the delayed vertical sync signal. If an 8 occurs on the count, or binary memory, of the Bidirectional Counter Logic Unit 9 ("1000"), the inputs to the select bits (ABC Selects) of both '251 units are zero, but since $Q_D$, pin 11, of the binary memory of the Bidirectional Counter Logic Unit 9 is a "1", the inverter 43 to the second stage '251 data selector unit (element 42) causes this '251 to be the only '251 enabled (remembering that a "0" strobe input [STB] enables, while a "1" strobe input disables). Therefore, the signal on the $D_0$ input of the second stage '251 (element 42—SHIFT 8) will be transmitted to the Y, or stage output, of the second stage '251 (element 42), and the data select ouput thus becomes the delayed vertical sync signal fed to the television monitor.

Shift Register Logic Unit

A shift Register Logic Unit 11, a preferred embodiment of which is shown in FIGS. 1 and 3A and 3B, and having a predetermined number of bit positions in the Shift Register, a shift register clock input, and a shift register input, shifts the vertical sync signal train one bit position "to the right" (i.e., away from the shift register input bit, first to last) in response to each clock pulse at its clock input which is connected to the clock system output of the Programmable Clock Generator. The Shift Register Logic Unit 11 shown here has two stages of 8-bit shift register units of integrated circuits, each of the '299 family (here two 74LS299's available from Texas Instruments, Incorporated were used—elements 51 and 52). The purpose of the Shift Register Logic Unit 11 is to have as shift register input the original vertical sync signal (which is "0" for 90 microseconds, "1" other times, and the period of which is 16,666.67 microseconds) and to produce as output, the same waveform but delayed by the delay selected. This will be an appropriate multiple of the period of an output clock pulse of the Programmable Clock Generator 8 as determined by the Bidirectional Counter Logic Unit 9 which controls the Data Select Logic Unit 10. The Data Select Logic Unit 10 in turn enables only that corresponding bit position of the Shift Register Logic Unit 11 to transmit its contents or logic state through the Data Select Logic Unit 10 to be outputted to the data select output as the delayed vertical sync signal. It is this vertical sync signal which is used in the composite sync signal.

Each '299 shift register unit stage has a shift register unit input, a clock input, and 8 bits of shift register bit storage positions $A_A, \ldots, Q_H$. The inverted output of the Programmable Clock Generator 8 (pin 7[$\overline{Q}$] of the J-K flip-flop 24 of the Programmable Clock Generator 8) is connected to the clock input of the first stage. The vertical sync signal is connected to the shift register unit input of the first stage shift register unit 51 which is also the shift register input of the shift register means. Prior to the first clock pulse, $Q_A$ is not responsive to the shift register unit input signal. Upon the first clock pulse input, the shift register unit input logic state value is transferred to the $Q_A$ bit storage position of the first stage shift register unit '299 (element 51). Upon the second clock pulse, the content of $Q_A$ is transferred to $Q_B$ and the current shift register unit input is transferred to $Q_A$. Upon the next clock pulse being received at the clock input of the stage, the content of $Q_B$ is transferred to $Q_C$, the contents of $Q_A$ transferred to $Q_B$, and the current shift register unit input is transferred to $Q_A$. Upon the eighth clock pulse, the contents of $Q_H$ of the first stage shift register unit is transferred to $Q_A$ of the second stage '299 shift register unit (element 52) since $Q_H$ of the first stage shift register unit is connected to the shift register unit input of the second stage. Thus, the second stage '299 (element 52) works as an extension of the first stage '299 (element 51) to perform the role of one continuous shift register. It should be noted that both stages have the same clocking at their clock inputs. Thus, each bit position of the Shift Register Lock Unit 11 produces the base vertical sync signal delayed by an appropriate incremental multiple of Programmable Clock Generator 8 output clock periods. That is, $Q_A$ of the first stage '299 shift register unit (element 51) has the original vertical sync pulse delayed by one period of the clock of the Programmable Clock Generator 8; $Q_B$ of the first stage '299 (element 51) has the original vertical sync pulse delayed by two periods of the Programmable Clock Generator; . . . ; $Q_G$ of the second stage '299 (element 52) has the original vertical sync pulse delayed by 15 periods of the Programmable Clock Generator. It is then the function of the Data Select Logic Unit 10 to switch the appropriate bit storage position of the Shift Register Lock Unit 11 to be the vertical signal of the composite sync signal for the period of one frame, that is, until the Change-Count signal is received. Upon the occurrence of this signal, the Bidirectional Counter Logic Unit 9 will be either uncounted or downcounted as per the predetermined sequence, which in turn causes the next frame to be delayed by the appropriate amount. This causes the frame to be redisplayed such that the picture is shifted slightly from that of the prior frame but significantly less than the distance between the original horizontal lines. In this manner, the Raster Erase function of obscuring these original horizontal raster lines is achieved.

As mentioned above, if the arrangement described utilizes a jumper across contact points JP2, it vertically shifts each pair of fields and, in effect, each frame by an integer amount. This is suitable in the present example because the same field representing a static video scene is repeatedly presented on the monitor screens. Thus, fields are presented at the frame rate by virtue of flip-flop 15 being connected to function as a divide-by-two counter. In video systems wherein it is desired to present non-interlaced fields and frames, the divide-by-two feature associated with flip-flop 15 and jumper JP2 can be avoided by having a jumper connect JP1 instead. It is also unnecessary to deal with stripping the original vertical sync signal out of the composite video as performed in U.S. Pat. No. 4,096,530 by making use of the original vertical sync signal and basic clock pulses that come directly from the Timing and Sync Generator 6. In this manner, no stripping circuit is needed, and the variably delayed vertical sync signal output of the Raster Erase System 7 is fed as the vertical sync signal input of the composite video signal.

The repetition rate of the vertical and horizontal sync pulses depends on the scan rate of the video system being employed. The invention is described herein in reference to a video system having line rates of 525/60 Hz and which has a 2:1 interlace. Those skilled in the art will appreciate, however, that the principles set forth will enable those skilled in the art to adapt the invention for TV line rates of 625/50 hz., 875/60 Hz., 1023/50 Hz., and other line rates. The invention will also work equally as well in non-interlaced systems.

The illustrative raster shift means has been described as applied to a television monitor picture tube and as implemented with integrated circuit logic devices and discrete logic elements. Those skilled in the art will recognize, however, that the system can be used with other raster scan devices and recording techniques such as laser-based recording, electrostatic copying and the like. It can also be implemented in other ways such as with a combination of logic devices suitably programmed to perform the timing functions and properly sequence the events. Accordingly, the true scope of the invention is to be determined by the claims which follow, and such claims are intended to cover all modifications coming within the true spirit and scope of the invention.

We claim:

1. A method of obscuring the perception of a base raster of a raster scan display device by bidirectionally vertically shifting said base raster in a manner in which a sequence of other rasters are produced with a maximum shift of any one of such other rasters in either direction being less than the distance between a pair of adjacent horizontal scan lines of said base raster, said base raster being produced by scanning an electron beam in response to original vertical and horizontal sync pulses, said method comprising:

presenting a predetermined number of rasters with the horizontal lines thereof shifted vertically by a predeterminedly-changed amount in a cyclical sequence wherein
- (a) in one stage of said sequence, rasters are presented each at an increasingly higher position relative to the position corresponding to said base raster in response to
  - (i) delayed vertical sync signals each of which is predeterminedly increasingly delayed relative to the corresponding original vertical sync pulses, and to
  - (ii) original horizontal sync pulses, and
- (b) in an opposite stage of said sequence, rasters are presented each at a lower position relative to the immediately preceding raster in response to
  - (i) delayed vertical sync signals each of which is delayed by a predeterminedly decreased amount of time relative to the time of delay of the immediately preceding delayed vertical sync signal, and to
  - (ii) original horizontal sync pulses.

2. A method of obscuring the perception of a base raster of a raster scan display device by bidirectionally vertically shifting said base raster in a manner in which a sequence of successive rasters are produced with the maximum shift of any successive raster in either direction being less than the distance between a pair of adjacent horizontal scan lines of said base raster, said method comprising the steps of:
- (a) presenting a base raster produced by scanning an electron beam in response to
  - (i) original vertical sync pulses and to
  - (ii) original horizontal sync pulses, and
- (b) then presenting a predetermined number of successive rasters with the horizontal lines thereof shifted vertically by a predeterminedly-changed amount in a cyclical sequence, wherein
- (A) in one stage of said sequence, rasters are presented each at an increasingly higher position relative to the position corresponding to said base raster in response to
  - (i) delayed vertical sync signals each of which is predeterminedly increasingly delayed relative to the corresponding vertical sync pulses, and to
  - (ii) original horizontal sync pulses, and
- (B) in a subsequent stage of said sequence, the balance of said successive rasters are presented each at a lower position relative to the immediately preceding one of said successive rasters in response to
  - (i) delayed vertical sync signals each of which is predeterminedly delayed by a decreased amount of time relative to the time of the delay of the immediately preceding delayed vertical sync signal, and to
  - (ii) original horizontal sync pulses.

3. In apparatus for use with raster scan display device having input means for receiving vertical sync signals for initiating vertical deflection, horizontal sync signals for initiating horizontal deflection, and separate picture information signals, and a display tube controllable by successive vertical sync signals to produce successive rasters comprised of vertically-spaced horizontal lines intensity modulated by said picture information signals, the improvement which results in the presentation of:
- (i) a base raster produced in response to original vertical sync signals corresponding to original vertical sync pulses and original horizontal sync signals identical to original horizontal sync pulses, and
- (ii) a predetermined number of shifted rasters displayed with the horizontal lines thereof shifted vertically in sequence, and wherein in said sequence a predetermined number of said shifted rasters are shifted vertically upward, each by a predetermined amount relative to the position of said base raster, with the horizontal lines of the highest-shifted raster being below the next upwardly-adjacent horizontal lines of said base raster, to thereby reduce perception of space between the horizontal lines in the base raster, said improvement comprising:
- (a) means effective in response to the occurrence of a sequence of a predetermined number of said original vertical sync pulses for producing a vertical sync signal for each of said original vertical sync pulses, with the produced vertical sync signals occurring in a multistage cycle wherein:
  - (i) in one stage a predetermined number of produced vertical sync signals are each delayed by a predeterminedly increased amount of time relative to the original vertical sync signal with which each corresponds but short of being delayed such that the horizontal lines of the highest-shifted raster lines would correspond with the immediately upward-adjacent horizontal lines of the base raster,
  - (ii) in another stage, a predetermined number of produced vertical sync signals are each delayed by a predeterminedly decreased amount of time relative to the time of delay of the immediately preceding produced vertical sync signal; and
- (b) means for controlling said display device in response to:
  - (i) the horizontal sync signals for said raster, and to
  - (ii) said produced vertical sync signals.

4. Means for vertically shifting a predetermined number of rasters representing a picture on the display tube of a raster scan display device in order to obscure the presentation of the horizontal lines of said rasters ordinarily visible on the face of the display device, said means comprising:
- (a) means for producing uniformly-timed trains of original horizontal sync pulses and original vertical sync pulses;
- (b) means responsive to the occurrence of a sequence of original vertical sync pulses for cyclically producing a sequence of delayed vertical sync signals corresponding respectively to the shifted rasters to be presented and to the original vertical sync pulses wherein:
- (A) in one stage of said sequence a predetermined number of produced vertical sync signals are each delayed by a predeterminedly increased amount of time relative to the timing of a respective original vertical sync pulse, and
- (B) in another stage of said sequence, a predetermined number of produced vertical sync signals are each delayed by a predeterminedly decreased amount of time relative to the delay time of the immediately preceding produced vertical sync signal.

5. In apparatus for use with a system having a raster scan display device operative under the control of video information signals and horizontal and vertical sync signals; the improvement constituting means for vertically shifting the raster of said display device thereby to obscure the perception of the lines of said raster, said improvement comprising:

(a) means for producing a sequence of original horizontal sync pulses and original vertical sync pulses;

(b) means for producing an End-of-Field pulse a predeterminedly-fixed amount of time after each original vertical sync pulse;

(c) means for producing a Change-Count pulse (i) identical to said End-of-Field pulse when said display device is operated in a non-interlace mode and (ii) in response to every other End-of-Field pulse when said device is operated in an interlace mode;

(d) horizontal sync signal input means connected to said display device;

(e) vertical sync signal input means connected to said display device;

(f) means for supplying said sequence of horizontal sync pulses to said horizontal sync signal input means;

(g) bidirectional counter means having a binary memory, input means for receiving said Change-Count pulses as clock pulses to said bidirectional counter means, output means representing the binary state of said binary memory, and said bidirectional counter means being effective for cyclically counting up and counting down the binary state of said memory in response to said Change-Count pulses received at said input means;

(h) means controlled by said output means of said bidirectional counter means for producing a sequence of vertical sync signals each of which is delayed relative to a respective original vertical sync pulse by an amount of time proportionally related to said binary state of said binary memory of said bidirectional counter; and (i) means for supplying said sequence of produced vertical sync signals to said vertical sync signal input means to said display device.

6. In apparatus for use with a raster scan display device operative under the control of video information signals, horizontal sync signals, and vertical sync signals, the improvement constituting means for vertically shifting said raster thereby to obscure the perception of the lines thereof, said improvement comprising:

(a) means for producing a sequence of original horizontal sync pulses and original vertical sync pulses;

(b) means for producing an End-of-Field pulse a predeterminedly-fixed amount of time after each original vertical sync pulse;

(c) interlace flip-flop means for producing Change-Count pulses in response to:
  (i) End-of-Field pulses when said display device is operated in a non-interlace mode; and
  (ii) alternate End-of-Field pulses when said display device is operated in an interlace mode;

(d) horizontal sync signal input means connected to said device;

(e) vertical sync signal input means connected to said device;

(f) means for supplying said sequence of original horizontal sync pulses to said horizontal sync signal input means;

(g) bidirectional counter means having a binary memory storing a binary state, input means for receiving said Change-Count pulses as clock pulses to said bidirectional counter means, output means outputting the binary state of said binary memory and having output bits corresponding in number to the bits of said binary memory, and said bidirectional counter means being effective for cyclically counting up and counting down the binary state of said memory in response to said Change-Count pulses received at said input means;

(h) shift register means comprising a shift register input, and a contents having bit positions corresponding in number to at least the number of frames to be displayed as interlineations between two of the original horizontal raster lines;

(i) programmable clock generator means having a clock system output for providing output clock pulses to said input of said shift register, with a period of each of said output clock pulses being selectively predetermined and such that the time equal to the product of
  (1) the number of interlineations multiplied by
  (2) the period of said programmable clock generator output clock pulse is less than the time between original vertical sync pulses;

(j) data select means for selecting the bit position of said contents of said shift register means corresponding to the binary state of said binary memory of said bidirectional counter;

(k) output means for supplying to said vertical sync signal input means the signal on the bit position of said contents of said shift register means selected by said data select means as the delayed vertical sync signal and in the same sequence as generated, whereby
  (i) the original vertical sync pulse is received by said shift register means,
  (ii) said original vertical sync pulses are right-shifted through the bit positions of said shift register means one position for each said output clock pulse of said programmable clock generator,
  (iii) a train of binary information in said bit position of said shift register means corresponding to the binary state of said binary memory of said bidirectional counter is fed by said data select means to said output means,
  (iv) each bit of said train of binary information in said bit position of said shift register means reaches said output means delayed relative to its corresponding original vertical sync pulse by an amount of time equal to said binary state of said binary memory of said bidirectional counter multiplied by the period of a single output clock pulse,
  (v) an End-of-Field pulse is produced,
  (vi) a Change-Count pulse
    (a) identical to said End-of-Field pulse when said display device is operated in a non-interlace mode, and
    (b) responsive to every other End-of-Field pulse when said display device is operated in an interlace mode is received by said bidirectional counter, and
  (vii) said binary state of said binary memory of said bidirectional counter is changed by one in one direction when said binary state of said binary memory of said bidirectional counter had most previously been all zero bits rather than all one bits and is changed by one in the opposite direction when said binary state of said binary memory had most previously been all one bits rather than all zero bits.

7. The invention of claim 6, wherein said programmable clock generator means comprises:
   (a) a basic clock input means providing basic clock input pulses;
   (b) an n-bit position switch having $2^n$ binary settings and an n-bit position output;
   (c) an n-bit binary counter having a count, a clock input connected to said basic clock input means, a reset input, a load input, a ripple-carry output, and an n-bit input setting connected to the n-bit position output of said n-bit position switch;
   (d) a flip-flop having an output, an input connected to said ripple-carry output of said binary counter, and a clock input connected to said basic clock input means wherein said output of said flip-flop changes state when concurrently said input of said flip-flop is at a logic "1" logic state and a clock pulse occurs at said clock input;
   (e) load means to provide a logic "1" to said load input of said binary counter when both said input of said flip-flop and said output of said flip-flop are both logic "1" whereby said count of said binary counter is set to said binary setting of said n-bit position switch upon the occurrence of the next basic clock input pulse at said clock input of said binary counter; and
   (f) said clock system output has said output of said flip-flop connected thereto whereby said clock system output provides a logic "1" output for $2^n$ periods of the basic clock input pulse followed by a logic "0" output for a multiple of periods of the basic clock input pulse equal to ($2^n$ minus said manual setting of said n-bit position switch).

8. The invention of claim 6, wherein said bidirectional counter means comprises:
   (a) a bidirectional up/down counter having a binary memory including a binary state, a clock input, an up/down input bit, a load input, and a ripple-carry output wherein said clock input is connected to said interlace flip-flop means for receiving said Change-Count pulses, said ripple-carry output is energized when the binary state of said binary memory is either all zeros or all ones, said up/down input bit is either a logic "0" or a logic "1" and determines whether said bidirectional up/down counter will count up or count down;
   (b) a direction flip-flop having an output, a clock input, and a direction-state memory wherein said direction-state memory is either a logic "0" or logic "1," said output of said direction flip-flop being the same logic state as said direction-state memory, said direction-state changes to the opposite binary logic state upon the concurrence of (i) a Change-Count pulse and (ii) an energization of said ripple-carry output of said bidirectional up/down counter at said clock input of said direction flip-flop;
   whereby said binary memory of said bidirectional counter means provides a binary counting sequence which alternately counts up and counts down in response to said Change-Count pulses.

9. The invention of claim 6, wherein said data select means comprises:
   (a) first and second stages of data selector units each having (1) a plurality of data input bits, (2) a plurality of select bits connected to all but the highest bit of said output bits of said bidirectional counter means, (3) a strobe input, and (4) a stage output, wherein
      (i) the number of data input bits of all data selector units total at least the number of bit positions of said contents of said shift register means,
      (ii) each of said data input bits is connected to a corresponding bit position of said contents of said shift register means,
      (iii) said first stage data selector unit of said data selector means is connected to the highest bit of said output bits of said bidirectional counter means,
      (iv) said select bits are decoded to select the bit corresponding to the decimal number equivalent to the binary state of said select bits of said data input bits of said data selector unit when said strobe input of said data selector unit is energized whereupon the logic state at said corresponding bit of said corresponding data input bit is transferred to said stage output of said data selector unit,
   (b) an inverter having an input and an output, said output being at the opposite binary logic state to that at said input, said input of said inverter is connected to the highest bit of said output bits of said bidirectional counter means and said output of said inverter is connected to said strobe bit of said second stage data selector unit;
   (c) a data select output connected to said stage outputs of both stages of said data selector units and having the same logic state as that of the stage output of the data select unit stage which has its strobe input enabled.

10. The invention of claim 6, wherein said shift register means comprises first and second stages of shift register units each having (1) a clock input, (2) a shift register unit input, and (3) a plurality of bit storage positions, the total of bit storage positions of all said stages of shift register units being said contents of said shift register means, and wherein
   said first stage handles the lower bits of said shift register means,
   said second stage handles the upper bits of said shift register means,
   the first position of said bit storage positions of each stage being that which would receive the logic state at said shift register unit input of said stage upon the occurrence of the next clock pulse at said clock input of said stage,
   the last position of said bit storage positions of each stage being that storage position which would receive the logic stage introduced at the shift register unit input of said stage which is most delayed in time among all bit storage positions of said stage, whereby each bit storage position will have transferred to it the binary logic state of the previous bit storage position upon occurrence of each clock pulse at said clock input of said stage,
   said input of said shift register means is connected to said shift register unit input of said first stage shift register unit, said last bit storage position of said first stage shift register unit is connected to the shift register unit input of said second stage shift register unit, said clock system output of said programmable clock generator is connected to the clock inputs of both said stages of shift register units for providing output clock pulses to said clock inputs of both said stages, and said means for producing a sequence of original vertical sync pulses is connected to said shift register unit input of said first stage shift register unit.

11. An apparatus as set forth in claim 3 wherein said produced vertical sync signals include, in still another stage, an undelayed produced vertical sync signal.

12. A shifting means as set forth in claim 4 wherein said occurrence responsive means also produces an undelayed vertical sync signal and wherein there is included means for supplying said delayed vertical sync signals for each raster to said monitor as an alternative to supplying the corresponding o

* * * * *